(12) United States Patent
Kim et al.

(10) Patent No.: US 10,942,678 B2
(45) Date of Patent: Mar. 9, 2021

(54) METHOD OF ACCESSING DATA IN STORAGE DEVICE, METHOD OF MANAGING DATA IN STORAGE DEVICE AND STORAGE DEVICE PERFORMING THE SAME

(71) Applicant: SAMSUNG ELECTRONICS CO., LTD., Suwon-si (KR)

(72) Inventors: Jin-Young Kim, Seoul (KR); Jae-Duk Yu, Seoul (KR); Yu-Hun Jun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/292,769

(22) Filed: Mar. 5, 2019

(65) Prior Publication Data

US 2020/0050400 A1 Feb. 13, 2020

(30) Foreign Application Priority Data

Aug. 9, 2018 (KR) .......................... 10-2018-0092826

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC .................................................. G06F 12/0246
See application file for complete search history.

(56) References Cited

U.S. PATENT DOCUMENTS

| | | | |
|---|---|---|---|
| 8,001,337 B2 | 8/2011 | Tanaka | |
| 8,332,575 B2 | 12/2012 | Kim et al. | |
| 8,438,195 B2 | 5/2013 | Kim et al. | |
| 8,995,203 B2 | 3/2015 | Oh et al. | |
| 9,195,583 B2 | 11/2015 | Jung et al. | |
| 9,396,107 B2 | 7/2016 | Lee et al. | |
| 9,916,091 B2 | 3/2018 | Zheng et al. | |
| 2010/0037005 A1 | 2/2010 | Kim et al. | |
| 2012/0290781 A1 | 11/2012 | Seo et al. | |
| 2014/0229655 A1* | 8/2014 | Goss ................... | G06F 11/1048 711/103 |

FOREIGN PATENT DOCUMENTS

| | | |
|---|---|---|
| KR | 10-2009-0098276 | 9/2009 |
| KR | 10-1146082 | 5/2012 |
| KR | 10-1403922 | 5/2014 |

* cited by examiner

*Primary Examiner* — Edward J Dudek, Jr.
(74) *Attorney, Agent, or Firm* — F. Chau & Associates, LLC

(57) ABSTRACT

A method of accessing data in a storage device including first and second nonvolatile memories of different types is provided. The method includes setting a meta data attribute table by classifying a plurality of meta data based on a plurality of data attributes and accessible memory types, detecting a data attribute of first meta data among the plurality of meta data based on the meta data attribute table in response to receiving a first access request for the first meta data, determining a target memory optimized for the first meta data from among the first and second nonvolatile memories based on the detected data attribute of the first meta data, and performing an access operation on the target memory based on the first meta data. The plurality of meta data are used for controlling an operation of the storage device.

20 Claims, 14 Drawing Sheets

FIG. 5

MDA_TABLE

| META DATA | ATTRIBUTE | ACCESS ALLOWED MEMORY |
|---|---|---|
| MDAT1 | ATTR1 | NVM1 |
| MDAT2 | ATTR2 | NVM2 |
| MDAT3 | ATTR3 | NVM2 |
| MDAT4 | ATTR4 | NVM1 |
| ⋮ | ⋮ | ⋮ |

METHOD OF ACCESSING DATA IN STORAGE DEVICE, METHOD OF MANAGING DATA IN STORAGE DEVICE AND STORAGE DEVICE PERFORMING THE SAME

CROSS-REFERENCE TO RELATED APPLICATION

This U.S. non-provisional application claims priority under 35 USC § 119 to Korean Patent Application No. 10-2018-0092826, filed on Aug. 9, 2018 in the Korean Intellectual Property Office (KIPO), the disclosure of which is incorporated by reference in its entirety herein.

BACKGROUND

1. Technical Field

Exemplary embodiments relate generally to storage devices, and more particularly to methods of accessing and managing data in storage devices, and storage devices performing the methods.

2. Discussion of Related Art

Data storage devices may include one or more semiconductor memory devices. Examples of such data storage devices include solid state drives (SSDs). Solid state drives have various design and performance advantages over conventional hard disk drives (HDDs). Examples of these advantages include the absence of moving mechanical parts, higher data access speeds, improved stability and durability, and low power consumption. Solid state drives typically include nonvolatile memory devices such as flash memories. Recently, data storage devices having two or more different types of nonvolatile memory devices have been researched.

SUMMARY

At least one exemplary embodiment of the present inventive concept provides a method for efficiently accessing or managing meta data in a storage device that includes two or more different types of nonvolatile memories.

At least one exemplary embodiment of the present inventive concept provides a storage device performing the method for accessing or managing meta data.

According to an exemplary embodiment of the inventive concept, a method of accessing data in a storage device is provided. The storage device includes a first nonvolatile memory and a second nonvolatile memory that are different types of memories. The method includes setting a meta data attribute table by classifying a plurality of meta data based on a plurality of data attributes and accessible memory types, detecting a data attribute of first meta data among the plurality of meta data based on the meta data attribute table in response to receiving a first access request for the first meta data, determining a target memory optimized for the first meta data from among the first and second nonvolatile memories based on the detected data attribute of the first meta data, and performing an access operation on the target memory based on the first meta data. The plurality of meta data is used for controlling an operation of the storage device.

According to an exemplary embodiment of the inventive concept, a method of managing data in a storage device is provided. The storage device includes a first nonvolatile memory and a second nonvolatile memory that are different types of memories. The method includes generating a meta data attribute table including a plurality of entries, where each entry corresponds to one of a plurality of meta data used for controlling an operation of the storage; for each entry, selecting one of a plurality of data attributes that is appropriate for the meta data of the corresponding entry, and inserting the selected one data attribute into the corresponding entry; for each entry, selecting an optimized memory type from among the first and second nonvolatile memories based on the corresponding data attribute, and inserting the selected optimized memory type into the corresponding entry; and storing the meta data attribute table.

According to an exemplary embodiment of the inventive concept, a storage device including a first nonvolatile memory, a second nonvolatile memory, and a controller is provided. The first nonvolatile memory and the second nonvolatile memory are different types of memories. The controller controls an operation of the first nonvolatile memory and the second nonvolatile memory, sets a meta data attribute table by classifying a plurality of meta data based on a plurality of data attributes and accessible memory types, detects a data attribute of first meta data among the plurality of meta data based on the meta data attribute table in response to receiving a first access request for the first meta data, determines a target memory optimized for the first meta data from among the first and second nonvolatile memories based on the attribute of the first meta data, and performs an access operation on the target memory based on the first meta data. The plurality of meta data are used for controlling an operation of the storage device.

According to an exemplary embodiment of the inventive concept, a storage device including first and second nonvolatile memories and a controller is provided. The first nonvolatile memory and the second nonvolatile memory are different types of memories. The controller is configured to store a table comprising a plurality of entries, where each entry identifies one of a plurality of different data types and one of a plurality of different reliability types. The controller is configured to update each entry of the table to identify one of the first and second nonvolatile memories based on the corresponding data type and the corresponding reliability type. The controller is configured to receive a request including one of the plurality of data types, select one of the entries that match the included data type, and perform a command within the request on the memory identified by the selected entry.

The data attributes of the plurality of meta data may be checked, analyzed and classified in advance to set the meta data attribute table. When an access request for meta data is received, an optimized nonvolatile memory for the access-requested meta data may be determined based on the meta data attribute table and the data attribute of the access-requested meta data. Accordingly, the plurality of meta data may be efficiently managed and accessed with relatively high performance and reliability.

BRIEF DESCRIPTION OF THE DRAWINGS

Exemplary embodiments of the inventive concept will be more clearly understood from the following detailed description taken in conjunction with the accompanying drawings.

FIG. 5 is a diagram illustrating an example of a meta data attribute table included in a storage device and used in a method of accessing data according to an exemplary embodiment of the inventive concept.

DETAILED DESCRIPTION OF THE EXEMPLARY EMBODIMENTS

Figure 1:
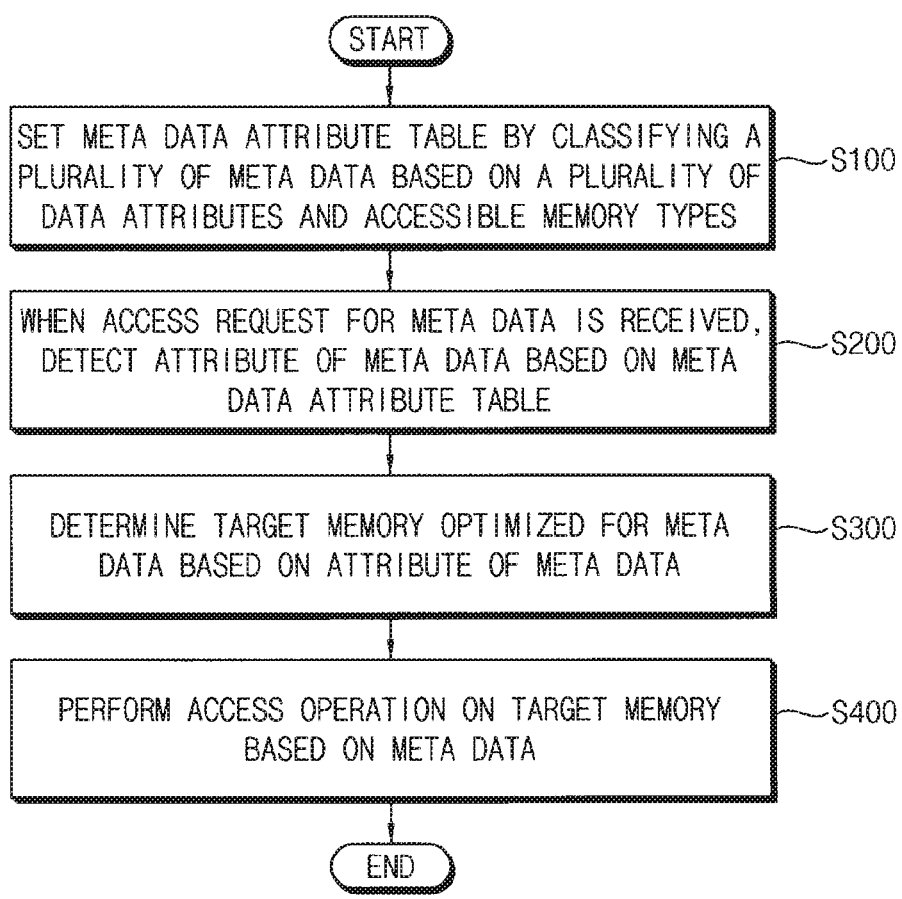
FIG. 1 is a flow chart illustrating a method of accessing data in a storage device according to an exemplary embodiment of the inventive concept.

The inventive concept will be described more fully with reference to the accompanying drawings, in which exemplary embodiments thereof are shown. The inventive concept may, however, be embodied in many different forms and should not be construed as limited to the exemplary embodiments set forth herein. Like reference numerals refer to like elements throughout this application.

FIG. 1 is a flow chart illustrating a method of accessing data in a storage device according to an exemplary embodiment of the inventive concept.

Referring to FIG. 1, a method of accessing data according to an exemplary embodiment of the inventive concept is executed or performed by a storage device that includes a first nonvolatile memory and a second nonvolatile memory. The first and second nonvolatile memories are different types of memories. Detailed configurations of the storage device will be described with reference to FIGS. 2 through 4.

In the method of accessing data in the storage device according to an exemplary embodiment of the inventive concept, a meta data attribute table is set by classifying a plurality of meta data based on a plurality of data attributes and accessible memory types (step S100). The plurality of meta data are used for controlling an operation of the storage device. For example, the plurality of meta data may include at least one of register data and program sequence data that are generated and updated while firmware is executed. In an embodiment, the plurality of meta data additionally or alternately include at least one of address mapping data and bad block data, which are managed by a flash translation layer (FTL), a garbage collection operation and/or a wear leveling operation.

When an access request for one meta data of the plurality of meta data (e.g., a first access request for first meta data) is received, an attribute of the one meta data is detected based on the meta data attribute table (step S200) in response to receiving the access request for the one meta data. For example, the meta data attribute table may be searched based on information included in the first access request to detect an attribute of the first meta data. For example, the first access request may include an identifier that uniquely identifies one of the meta data listed in the meta data attribute table.

A target memory is determined based on the attribute of the access-requested meta data (e.g., the first meta data) (step S300). The target memory is optimized or best-fitted for the access-requested meta data and is one of the first nonvolatile memory and the second nonvolatile memory. For example, the meta data attribute table may be searched to determine a memory type optimized or best-fitted for the attribute of the first meta data. For example, the meta data attribute table may include an entry for each meta data of the plurality of meta data, where each entry indicates an attribute associated with the corresponding metadata and identifies one of the first and second nonvolatile memories (i.e., a target memory) in which data of the corresponding meta data is stored.

An access operation is performed on the target memory based on the access-requested meta data (e.g., the first meta data) (step S400). For example, the access operation may include at least one of read/program/erase operations for the first meta data.

In the method of accessing data in the storage device according to an exemplary embodiment of the inventive concept, the attributes of the plurality of meta data may be checked, analyzed and classified in advance to set the meta data attribute table. When an access request for meta data is received, an optimized nonvolatile memory for the access-requested meta data is determined based on the meta data attribute table and the attribute of the access-requested meta data. Accordingly, the plurality of meta data may be efficiently managed and accessed with relatively high performance and reliability.

Figure 2:
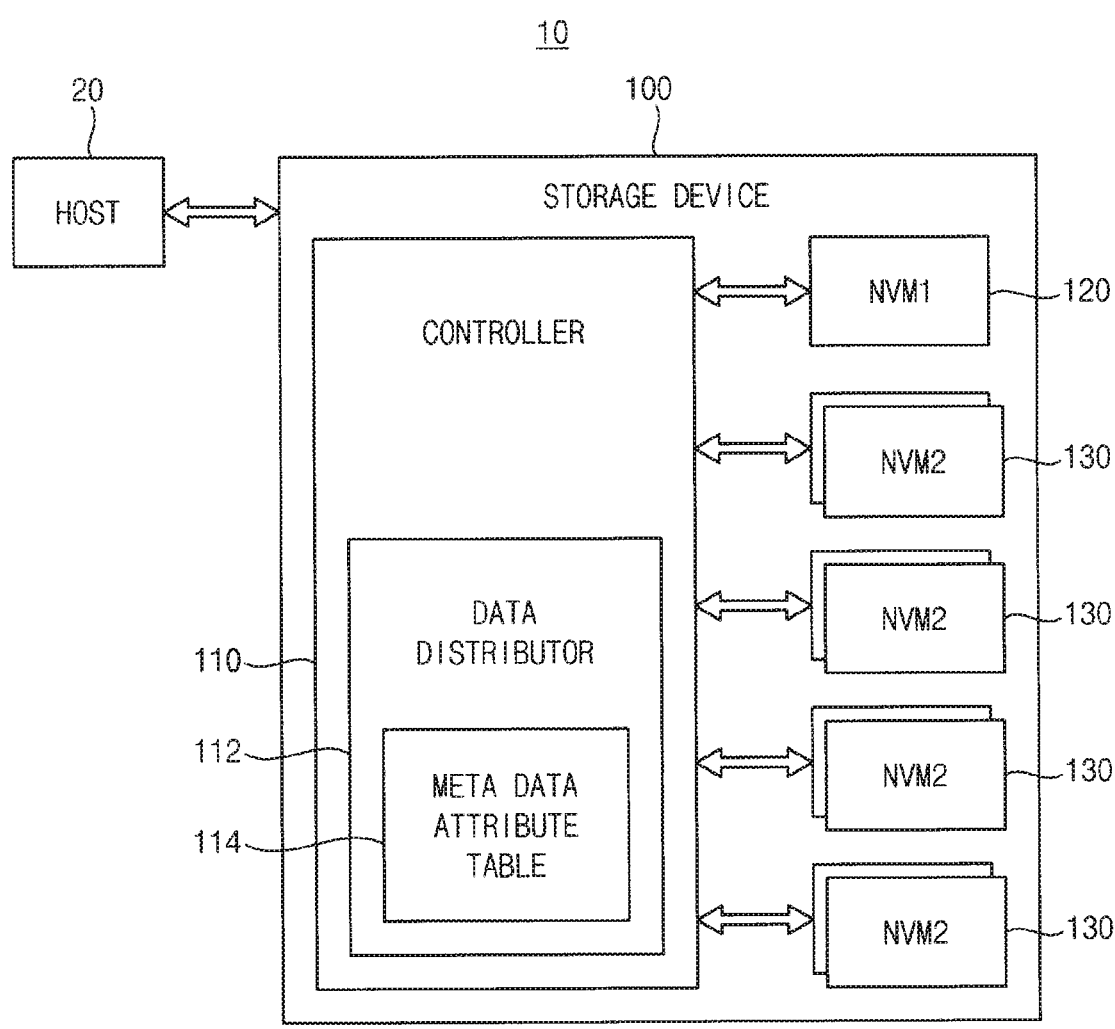
FIG. 2 is a block diagram illustrating a computing system including a storage device according to an exemplary embodiment of the inventive concept.

FIG. 2 is a block diagram illustrating a computing system including a storage device according to an exemplary embodiment of the inventive concept.

Referring to FIG. 2, a computing system 10 includes a host 20 (e.g., a host device) and a storage device 100 that communicates with the host 20.

The host 20 may be driven by executing an operating system (OS). For example, the host 20 may include a memory storing the OS and a processor that executes the OS. The operating system may include a file system for file management and a device driver for controlling peripheral devices including the storage device 100 at the operating system level. The file system may manage at least one of file names, file extensions, file attributes, file sizes, and cluster information of files accessed by requests from the host 20 or applications executed by the host 20. The file system may generate, delete and manage data on a file basis. The device driver may be a software module of a kernel for controlling the storage device 100. The host 20 or the applications executed by the host 20 may request read/program/erase operations to the storage device 100 via the device driver.

The host 20 may execute a plurality of applications that provide various services. For example, the host 20 may execute a video application, a game application, a web browser application, etc.

In some exemplary embodiments, the host 20 may be one of various electronic systems such as a personal computer, a laptop computer, a mobile phone, a smart phone, a tablet computer, a personal digital assistants (PDA), an enterprise digital assistant (EDA), a portable multimedia player (PMP), a digital camera, a music player, a portable game console, a navigation device, a wearable device, an internet of things (IoT) device, an internet of everything (IoE) device, an e-book reader, a virtual reality (VR) device, an augmented reality (AR) device, etc.

The storage device 100 includes a controller 110 (e.g., a control circuit), at least one first nonvolatile memory (NVM1) 120 and a plurality of second nonvolatile memories (NVM2) 130. For example, the storage device 100 may be attached to the host 20 or inserted into the host 20.

The controller 110 controls an operation of the nonvolatile memories 120 and 130, e.g., read/program/erase operations, based on a command and data that are received from the host 20.

The controller 110 may include a data distributor 112. The data distributor 112 may execute or perform the method of accessing data described with reference to FIG. 1. In an embodiment, the data distributor 112 is implemented by a processor that executes the method. For example, the data distributor 112 sets a meta data attribute table 114 by classifying a plurality of meta data based on a plurality of data attributes and accessible memory types, detects an attribute of first meta data among the plurality of meta data based on the meta data attribute table 114 in response to receiving a first access request for the first meta data, determines a target memory optimized for the first meta data based on the attribute of the first meta data, and performs an access operation on the target memory based on the first meta data. The plurality of meta data are used for controlling an operation of the storage device 100, and the target memory is one of the first nonvolatile memory 120 and the second nonvolatile memory 130.

In an exemplary embodiment, as will be described with reference to FIGS. 6 and 7, the first access request for the first meta data is received from the host 20 that is located outside the storage device 100. In another exemplary embodiment, as will be described with reference to FIGS. 8 and 9, the first access request for the first meta data is received from one of the first nonvolatile memory 120 and the second nonvolatile memory 130 that are located inside the storage device 100.

In an exemplary embodiment, the meta data attribute table 114 is set and stored at an initial operation time, and the pre-stored meta data attribute table 114 is loaded or restored to use after the initial operation time. For example, the meta data attribute table 114 may be set and stored in advance at a design/development phase or a manufacturing phase of the storage device 100. In an exemplary embodiment, the meta data attribute table 114 is set and stored whenever the storage device 100 is booted (e.g., powered on). For example, the meta data attribute table 114 may be stored in one of the nonvolatile memories 120 and 130 or in an additional memory (not shown) in the storage device 100.

In an exemplary embodiment, if the meta data attribute table 114 is set and stored at the initial operation time and the pre-stored meta data attribute table 114 is loaded or restored to use after the initial operation time as described above, an operation of setting the meta data attribute table 114 (e.g., step S110 in FIG. 1) is replaced with an operation of loading the pre-stored meta data attribute table 114 whenever the storage device 100 is booted.

In an exemplary embodiment, the meta data attribute table 114 is updated in real-time or during runtime according to an operation of the storage device 100. For example, newly generated meta data and associated information may be added to the meta data attribute table 114, and/or meta data that is no longer in use and associated information may be deleted from the meta data attribute table 114.

As will be described with reference to FIG. 2, the data distributor 112 may execute or perform a method of managing data according to exemplary embodiments.

Although not illustrated in FIG. 2, the controller 110 may further include an element associated with the FTL, and/or elements for performing the garbage collection operation and/or the wear leveling operation.

In an exemplary embodiment of the inventive concept, the first nonvolatile memory 120 and the second nonvolatile memory 130 are different types of memories. For example, the first nonvolatile memory 120 may have relatively high operating speed and high endurance and may be used as a buffer memory or a cache memory. The second nonvolatile memory 130 may have relatively large storage capacity and may be used as a primary data storage medium. In an exemplary embodiment, a given one of the second memory devices 130 has a larger storage capacity and a lower access speed than the first nonvolatile memory 120.

In an exemplary embodiment, the first nonvolatile memory 120 includes a phase change random access memory (PRAM), and the second nonvolatile memory 130 includes a flash memory. For example, the second nonvolatile memory 130 may include a NAND flash memory. In other exemplary embodiments, each of the first nonvolatile memory 120 and the second nonvolatile memory 130 may include any nonvolatile memory, e.g., a resistive random access memory (RRAM), a nano floating gate memory (NFGM), a polymer random access memory (PoRAM), a magnetic random access memory (MRAM), a ferroelectric random access memory (FRAM), a thyristor random access memory (TRAM), etc.

In some exemplary embodiments, the storage device 100 may be one of a solid state drive (SSD), a multi media card (MMC), an embedded multi media card (eMMC) and a universal flash storage (UFS). In other exemplary embodiments, the storage device 100 may be a secure digital (SD) card, a micro SD card, a memory stick, a chip card, a universal serial bus (USB) card, a smart card, or a compact flash (CF) card.

Figure 3:
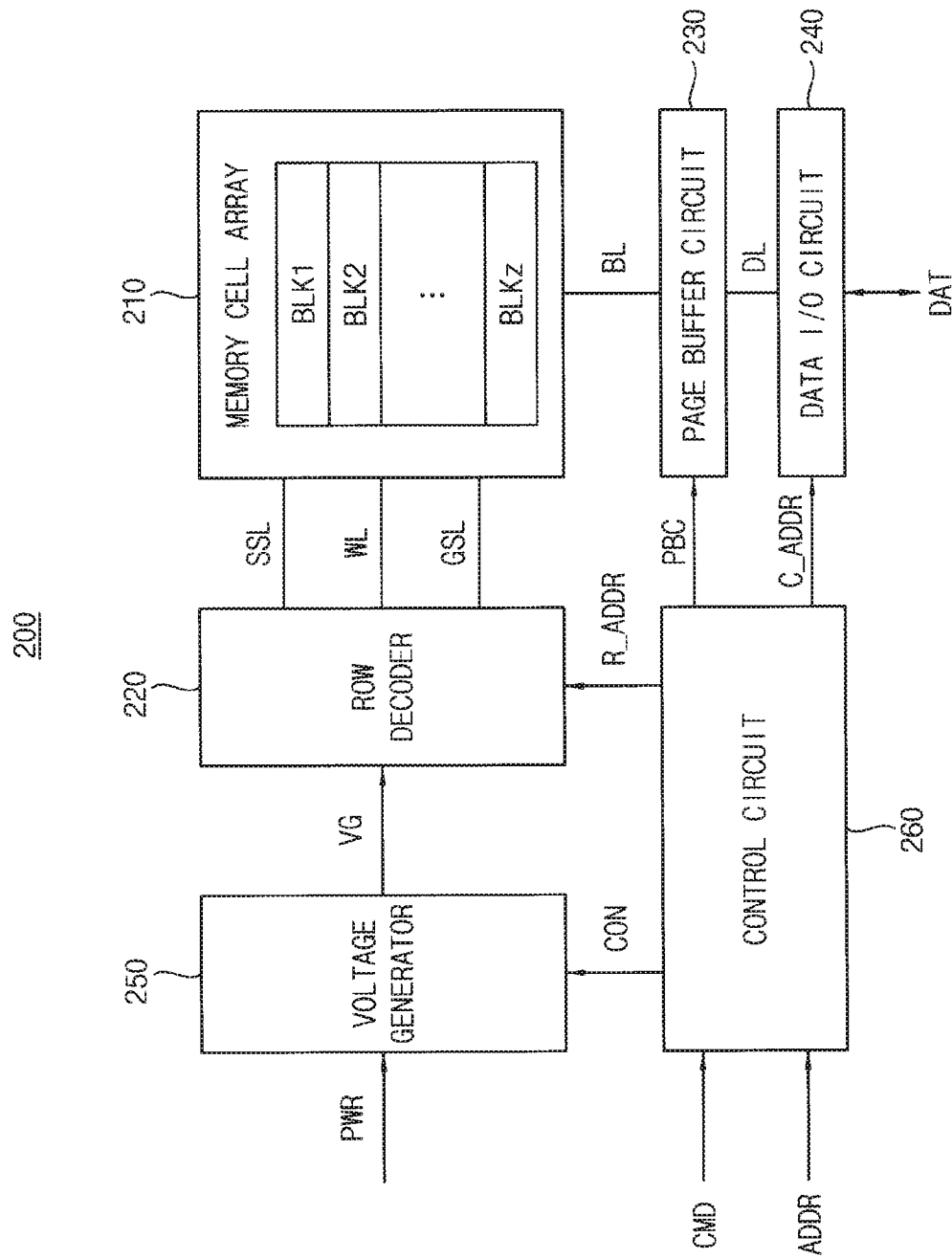
FIG. 3 is a block diagram illustrating an example of a nonvolatile memory included in a storage device according to an exemplary embodiment of the inventive concept.

FIG. 3 is a block diagram illustrating an example of a nonvolatile memory included in a storage device according to an exemplary embodiment of the inventive concept.

Referring to FIG. 3, a nonvolatile memory 200 includes a memory cell array 210, a row decoder 220 (e.g., a row decoding circuit), a page buffer circuit 230, a data input/output (I/O) circuit 240, a voltage generator 250 and a control circuit 260. The nonvolatile memory 200 may be one of the first nonvolatile memory 120 and the second nonvolatile memory 130 in FIG. 2.

The memory cell array 210 is connected to the row decoder 220 via a plurality of string selection lines SSL, a plurality of wordlines WL and a plurality of ground selection lines GSL. The memory cell array 210 is further connected to the page buffer circuit 230 via a plurality of bitlines BL. The memory cell array 210 may include a plurality of memory cells that are connected to the plurality of wordlines WL and the plurality of bitlines BL. The memory cell array 210 may be divided into a plurality of memory blocks BLK1, BLK2, ..., BLKz, each of which includes some of the memory cells. For example, if the nonvolatile memory 200 is a flash memory, the plurality of memory cells may be flash memory cells (e.g., NAND flash memory cells). If the nonvolatile memory 200 is a PRAM, the plurality of memory cells may be PRAM cells.

In some exemplary embodiments, the memory cell array 210 is a two-dimensional memory cell array, which is formed on a substrate in a two-dimensional structure (or a planar structure). In other exemplary embodiments, the memory cell array 210 is a three-dimensional memory cell array, which is formed on a substrate in a three-dimensional structure (or a vertical structure). In an example where the memory cell array 210 has the three-dimensional structure, the memory cell array 210 includes a plurality of cell strings (e.g., a plurality of vertical cell strings) that are vertically oriented such that at least one memory cell is located over another memory cell.

A three-dimensional vertical array structure may include vertical cell strings that are vertically oriented such that at least one memory cell is located over another memory cell. The at least one memory cell may include a charge trap layer. The following patent documents, which are hereby incorporated by reference in their entirety, describe suitable configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and US Pat. Pub. No. 2011/0233648.

The control circuit 260 receives a command CMD and an address ADDR from a memory controller (e.g., the controller 110 in FIG. 2), and controls erasure, programming and read operations of the nonvolatile memory 200 based on the command CMD and the address ADDR. An erasure operation may include performing a sequence of erase loops, and a program operation may include performing a sequence of program loops. Each program loop may include a program operation and a program verification operation. The program verification operation may be used to verify whether data was successfully programmed using the program operation. Each erase loop may include an erase operation and an erase verification operation. The erase verification operation may be used to verify whether data was successfully deleted using the erase operation. The read operation may include a normal read operation and data recover read operation.

For example, the control circuit 260 may generate control signals CON, which are used for controlling the voltage generator 250, may generate a control signal PBC for controlling the page buffer circuit 230, based on the command CMD, and may generate a row address R_ADDR and a column address C_ADDR based on the address ADDR. The control circuit 260 may provide the row address R_ADDR to the row decoder 220 and may provide the column address C_ADDR to the data I/O circuit 240. In an embodiment, the row address R_ADDR identifies one of the word lines WL and the column address C_ADDR identifies one of the bitlines BL.

The row decoder 220 may be connected to the memory cell array 210 via the plurality of string selection lines SSL, the plurality of wordlines WL and the plurality of ground selection lines GSL.

For example, in the data erase/program/read operations, the row decoder 220 may determine at least one of the plurality of wordlines WL as a selected wordline, and may determine the rest or remainder of the plurality of wordlines WL other than the selected wordline as unselected wordlines, based on the row address R_ADDR.

In addition, in the data erase/program/read operations, the row decoder 220 may determine at least one of the plurality of string selection lines SSL as a selected string selection line, and may determine the rest or remainder of the plurality of string selection lines SSL other than the selected string selection line as unselected string selection lines, based on the row address R_ADDR.

Further, in the data erase/program/read operations, the row decoder 220 may determine at least one of the plurality of ground selection lines GSL as a selected ground selection line, and may determine the rest or remainder of the plurality of ground selection lines GSL other than the selected ground selection line as unselected ground selection lines, based on the row address R_ADDR.

The voltage generator 250 may generate gate voltages VG that are required for an operation of the nonvolatile memory 200 based on a power PWR and the control signals CON. The gate voltages VG may be applied to the plurality of wordlines WL, the plurality of string selection lines SSL and the plurality of ground selection lines GSL via the row decoder 220. In addition, the voltage generator 250 may generate an erase voltage that is required for the data erase operation based on the power PWR and the control signals CON.

For example, during the erase operation, the voltage generator 250 may apply the erase voltage to a common source line and/or the bitlines BL of a memory block and may apply an erase permission voltage (e.g., a ground voltage) to all wordlines of the memory block or a portion of the wordlines via the row decoder 220. In addition, during the erase verification operation, the voltage generator 250 may apply an erase verification voltage simultaneously to all wordlines of the memory block or sequentially to the wordlines one by one.

For example, during the program operation, the voltage generator 250 may apply a program voltage to the selected wordline and may apply a program pass voltage to the unselected wordlines via the row decoder 220. In an embodiment, a level of the program voltage differs from a level of the program pass voltage. In addition, during the program verification operation, the voltage generator 250 may apply a program verification voltage to the selected wordline and may apply a verification pass voltage to the unselected wordlines via the row decoder 220. In an embodiment, a level of the program verification voltage differs from a level of the verification pass voltage.

In addition, during the normal read operation, the voltage generator 250 may apply a read voltage to the selected wordline and may apply a read pass voltage to the unselected wordlines via the row decoder 220. In an embodiment, a level of the read voltage differs from a level of the read pass voltage. During the data recover read operation, the voltage generator 250 may apply the read voltage to a wordline adjacent to the selected wordline and may apply a recover read voltage to the selected wordline via the row decoder 220. In an embodiment, a level of the read voltage differs from a level of the recover read voltage.

The page buffer circuit 230 may be connected to the memory cell array 210 via the plurality of bitlines BL. The page buffer circuit 230 may include a plurality of page buffers. In some exemplary embodiments, each page buffer is connected to one bitline. In other exemplary embodiments, each page buffer is connected to two or more bitlines.

The page buffer circuit 230 may store data DAT to be programmed into the memory cell array 210 or may read data DAT sensed from the memory cell array 210. In other words, the page buffer circuit 230 may operate as a write driver or a sensing amplifier according to an operation mode of the nonvolatile memory device 200.

The data I/O circuit 240 may be connected to the page buffer circuit 230 via data lines DL. The data I/O circuit 240 may provide the data DAT from an outside of the nonvolatile memory 200 (e.g., from the controller 110 in FIG. 2) to the memory cell array 210 via the page buffer circuit 230 or may provide the data DAT from the memory cell array 210 to the outside of the nonvolatile memory 200, based on the column address C_ADDR.

Figure 4:
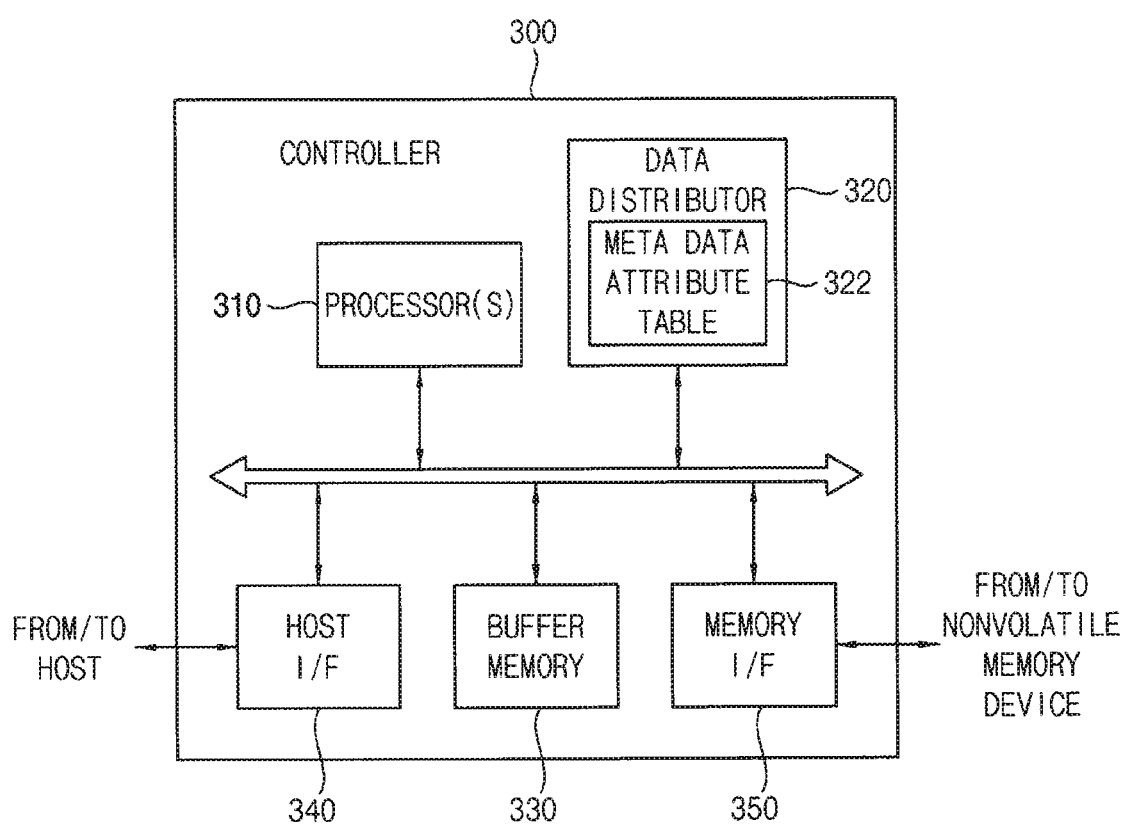
FIG. 4 is a block diagram illustrating an example of a controller included in a storage device according to an exemplary embodiment of the inventive concept.

FIG. 4 is a block diagram illustrating an example of a controller (e.g., a control circuit) included in a storage device according to exemplary embodiment of the inventive concept.

Referring to FIG. 4, a controller 300 includes at least one processor 310, a data distributor 320, a buffer memory 330, a host interface 340 and a memory interface 350. For example, the controller 110 of FIG. 2 may be implemented by controller 300.

The processor 310 may control an operation of the controller 300 in response to a command received via the host interface 340 from a host (e.g., the host 20 in FIG. 2). In some exemplary embodiments, the processor 310 controls respective components by employing firmware for operating the storage device 100.

The buffer memory 330 may store instructions and data executed and processed by the processor 310. For example, the buffer memory 330 may be implemented with a volatile memory device, such as a static random access memory (SRAM) or a dynamic random access memory (DRAM). In an exemplary embodiment, the buffer memory 330 is a cache memory for the processor 310.

The data distributor 320 sets and stores a meta data attribute table 322, and determines an optimized nonvolatile memory for meta data based on an attribute of the meta data when an access request for the meta data is received. The data distributor 320 and the meta data attribute table 322 may be substantially the same as the data distributor 112 and the meta data attribute table 114 in FIG. 2, respectively.

In some exemplary embodiments, at least a part of the data distributor 320 is implemented by hardware. For example, the data distributor 320 may be a part of the processor 310 or an additional processing unit for performing a data processing operation, and the meta data attribute table 322 may be stored in the buffer memory 330. In other exemplary embodiments, at least a part of the data distributor 320 is implemented as software (e.g., a software program). For example, the data distributor 320 may include instruction codes and/or program routines that are executed by the processor 310 and are stored in the buffer memory 330. In an embodiment, the data distributor 320 is a dedicated memory storing the instruction codes and/or program codes that are executed by the processor 310.

The host interface 340 may provide physical connections between the host and the storage device 100. The host interface 340 may provide an interface corresponding to a bus format of the host for communication between the host and the storage device 100. In some exemplary embodiments, the bus format of the host may be a small computer system interface (SCSI) or a serial attached SCSI (SAS) interface. In other exemplary embodiments, the bus format of the host may be a USB, a peripheral component interconnect (PCI) express (PCIe), an advanced technology attachment (ATA), a parallel ATA (PATA), a serial ATA (SATA), or a nonvolatile memory (NVM) express (NVMe) format.

The memory interface 350 may exchange data with the nonvolatile memory (e.g., the first nonvolatile memory 120 or the second nonvolatile memory 130 in FIG. 2). The memory interface 350 may transfer data to the nonvolatile memory, or may receive data read from the nonvolatile memory. In some exemplary embodiments, the memory interface 350 is connected to the at least one nonvolatile memory via one channel. In other exemplary embodiments, the memory interface 350 is connected to the at least one nonvolatile memory via two or more channels.

Although not illustrated in FIG. 4, the controller 300 may further include an error correction code (ECC) block (e.g., an error correction circuit). The ECC block for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), or a block coded modulation (BCM), or may perform ECC encoding and ECC decoding using the above-described codes or other error correction codes.

FIG. 5 is a diagram illustrating an example of a meta data attribute table included in a storage device and used in a method of accessing data according to an exemplary embodiment of the inventive concept.

Referring to FIG. 5, a meta data attribute table MDA_TABLE includes a plurality of meta data MDAT1, MDAT2, MDAT3, MDAT4, . . . , a plurality of data attributes ATTR1, ATTR2, ATTR3, ATTR4, . . . , and an access allowed memory (e.g., an accessible memory type or an optimized memory type) for each meta data. The meta data attribute table 114 may be implemented by the meta data attribute table MDA_TABLE. Relationships of the plurality of meta data, the plurality of data attributes and the optimized memory type may be arranged as a table (e.g., the meta data attribute table MDA_TABLE). For example, each entry of the meta data attribute table MDA_TABLE may identify one of the plurality of meta data, one of the data attributes, and one of two different types of nonvolatile memories to access.

In some exemplary embodiments, the plurality of data attributes include at least one of a first data attribute ATTR1, a second data attribute ATTR2, a third data attribute ATTR3 and a fourth data attribute ATTR4. The first data attribute ATTR1 may represent reliability for program/erase (P/E) cycles. For example, different types of memory can withstand a different number of P/E cycles before leading to a failure. The second data attribute ATTR2 may represent reliability for temperature. For example, a memory may have trouble retaining data when operating beyond a certain temperature, where that certain temperature varies according to the type of memory used. The third data attribute ATTR3 may represent reliability for data retention. The fourth data attribute ATTR4 may represent reliability for read disturbance. For example, reading a cell in a given memory can cause a nearby cell to change its value, and the likelihood of this occurring may vary according to the type of memory used.

In other exemplary embodiments, the plurality of data attributes further include at least one of other key parameters, such as performance. For example, the performance may include a read delay time (e.g., $t_R$) representing a time to transfer data in a memory cell array to an output buffer, a program delay time (e.g., $t_{PROG}$) representing a time to write data in an input buffer to a memory cell array, etc.

In some exemplary embodiments, when setting the meta data attribute table MDA_TABLE (e.g., step S100 in FIG. 1), the plurality of meta data MDAT1, MDAT2, MDAT3 and MDAT4 is listed, each of the plurality of meta data MDAT1, MDAT2, MDAT3 and MDAT4 is matched with a respective one of the plurality of data attributes ATTR1, ATTR2, ATTR3 and ATTR4, an optimized memory type for each of the plurality of meta data MDAT1, MDAT2, MDAT3 and MDAT4 is set to one of the first nonvolatile memory NVM1 and the second nonvolatile memory NVM2 based on the plurality of data attributes ATTR1, ATTR2, ATTR3 and ATTR4, and the meta data attribute table MDA_TABLE is stored based on relationships of the plurality of meta data MDAT1, MDAT2, MDAT3 and MDAT4, the plurality of data attributes ATTR1, ATTR2, ATTR3 and ATTR4, and the optimized memory types NVM1 and NVM2.

In an example of FIG. 5, the first meta data MDAT1 has the first data attribute ATTR1, and an optimized memory type for the first meta data MDAT1 is set to the first nonvolatile memory NVM1. Similarly, the second meta data MDAT2 has the second data attribute ATTR2, and an optimized memory type for the second meta data MDAT2 is set to the second nonvolatile memory NVM2. The third meta data MDAT3 may has the third data attribute ATTR3, and an optimized memory type for the third meta data MDAT3 is set to the second nonvolatile memory NVM2. The fourth meta data MDAT4 has the fourth data attribute ATTR4, and an optimized memory type for the fourth meta data MDAT4 is set to the first nonvolatile memory NVM1.

Figure 6:
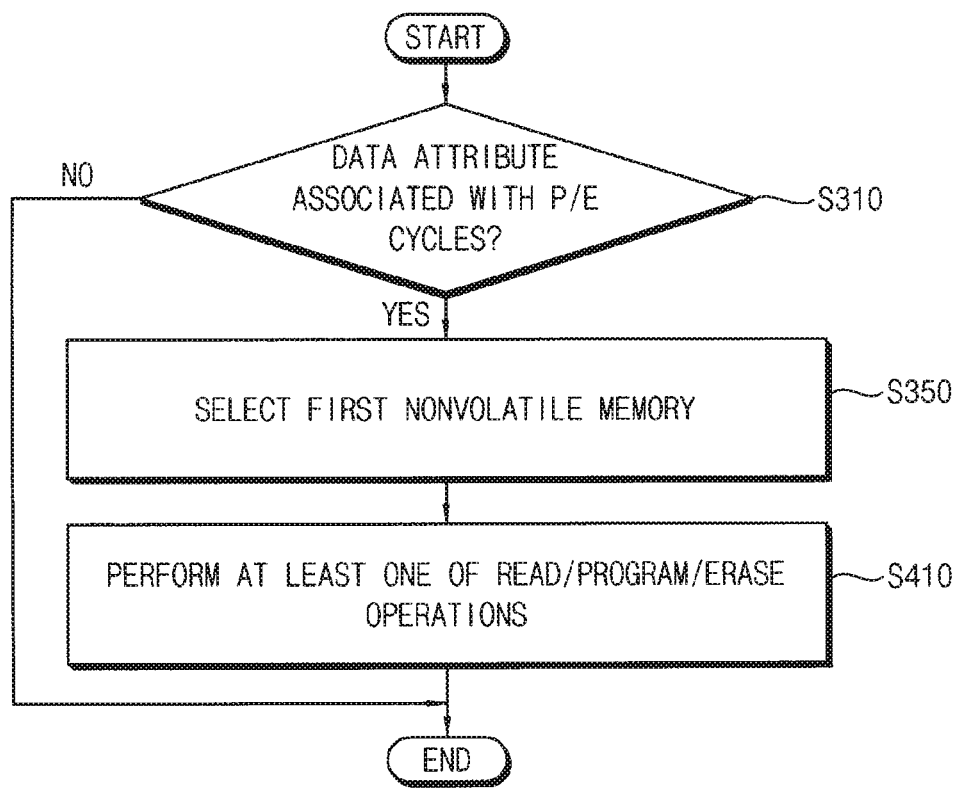
FIG. 6 is a flow chart illustrating an example of accessing data based on a method of accessing data according to an exemplary embodiment of the inventive concept.
Figure 7:
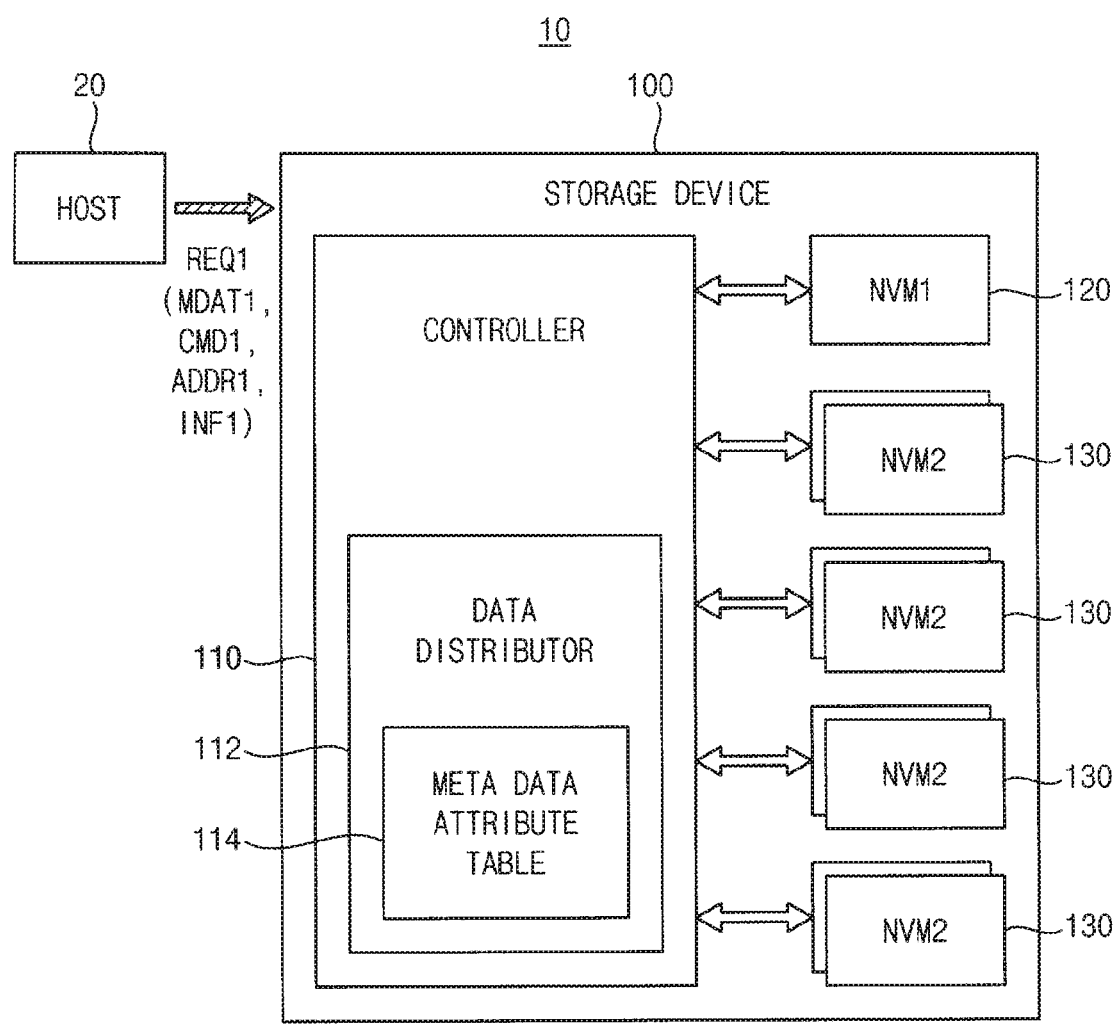
FIG. 7 is a diagram for describing an operation of accessing data of FIG. 6.

FIG. 6 is a flow chart illustrating a method of accessing data according to an exemplary embodiment of the inventive concept. FIG. 7 is a diagram for describing an operation of accessing data of FIG. 6.

Referring to FIGS. 1, 5, 6 and 7, to execute or perform the method of accessing data according to an exemplary embodiments, the meta data attribute table (e.g., the meta data attribute table MDA_TABLE in FIG. 5 or the meta data attribute table 114 in FIG. 7) is classified, set and stored in advance in step S100, and may be recognized by firmware that is executed by the controller 110 and/or the data distributor 112.

When detecting the attribute of the meta data (step S200), the controller 110 and/or the data distributor 112 may receive a first access request REQ1 for the first meta data MDAT1, and the attribute of the first meta data MDAT1 may be detected based on the meta data attribute table MDA_TABLE in response to receiving the first access request REQ1. For example, the first access request REQ1 may include the first meta data MDAT1, a first command CMD1, a first address ADDR1 and first information INFL The first command CMD1 and the first address ADDR1 may be associated with the first access request REQ1, and the first information INF1 may be associated with the first meta data MDAT1. The meta data attribute table MDA_TABLE may be searched based on the first meta data MDAT1 or the first information INF1 included in the first access request REQ1 to detect the attribute of the first meta data MDAT1.

In an exemplary embodiment, as illustrated in FIG. 5, the attribute of the first meta data MDAT1 is the first data attribute ATTR1 representing reliability for P/E cycles. For example, if the first meta data MDAT1 is security data that is used in a secure mode and requires a P/E operation to be executed a number of times greater than a reference number, the attribute of the first meta data MDAT1 may correspond to the first data attribute ATTR1. In addition, if the first meta data MDAT1 is the security data, the first access request REQ1 for the first meta data MDAT1 may be provided from the external host 20. For example, the security data could be a login identifier (ID) of a user or a password of the user, where it is desirable to have such data stored in a memory device capable of withstanding a certain minimum number of P/E cycles.

When determining the target memory (step S300), when the attribute of the first meta data MDAT1 corresponds to the first data attribute ATTR1 representing reliability for P/E cycles (step S310: YES), the first nonvolatile memory 120 may be selected as the target memory (step S350). The first nonvolatile memory 120 may have reliability for P/E cycles (e.g., durability) higher than that of the second nonvolatile memory 130. For example, the first nonvolatile memory 120 may include a PRAM.

When performing the access operation on the target memory (step S400), at least one of read/program/erase operations may be performed on the first nonvolatile memory 120 (step S410). For example, if the first command CMD1 included in the first access request REQ1 is a write command, the first meta data MDAT1 is programmed or stored in the first nonvolatile memory 120 based on the first address ADDR1. For example, the first meta data MDAT1 may be stored in a location of the first nonvolatile memory 120 associated with the first address ADDR1. If the first command CMD1 included in the first access request REQ1 is a read command, the first meta data MDAT1 is retrieved or read from the first nonvolatile memory 120 based on the first address ADDR1. For example, the first meta data MDAT1 may be read from a location of the first nonvolatile memory 120 associated with the first address ADDR1. If the first command CMD1 included in the first access request REQ1 is an erase command, the first meta data MDAT1 is erased or deleted from the first nonvolatile memory 120 based on the first address ADDR1. For example, the first meta data MDAT1 may be deleted from a location of the first nonvolatile memory 120 associated with the first address ADDR1.

When the attribute of the first meta data MDAT1 does not correspond to the first data attribute ATTR1 representing reliability for P/E cycles (step S310: NO), steps S350 and S410 are not performed, and an operation of searching the meta data attribute table MDA_TABLE may be repeated until the attribute of the first meta data MDAT1 is detected.

Figure 8:
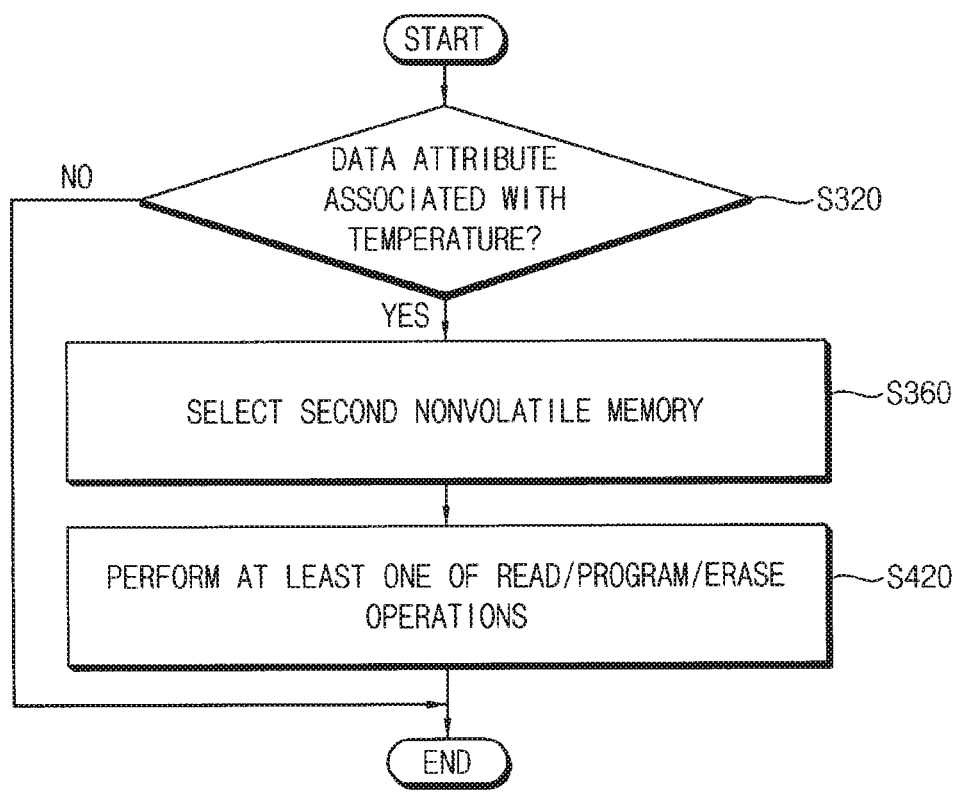
FIG. 8 is a flow chart illustrating another example of accessing data based on a method of accessing data according to an exemplary embodiment of the inventive concept.
Figure 9:
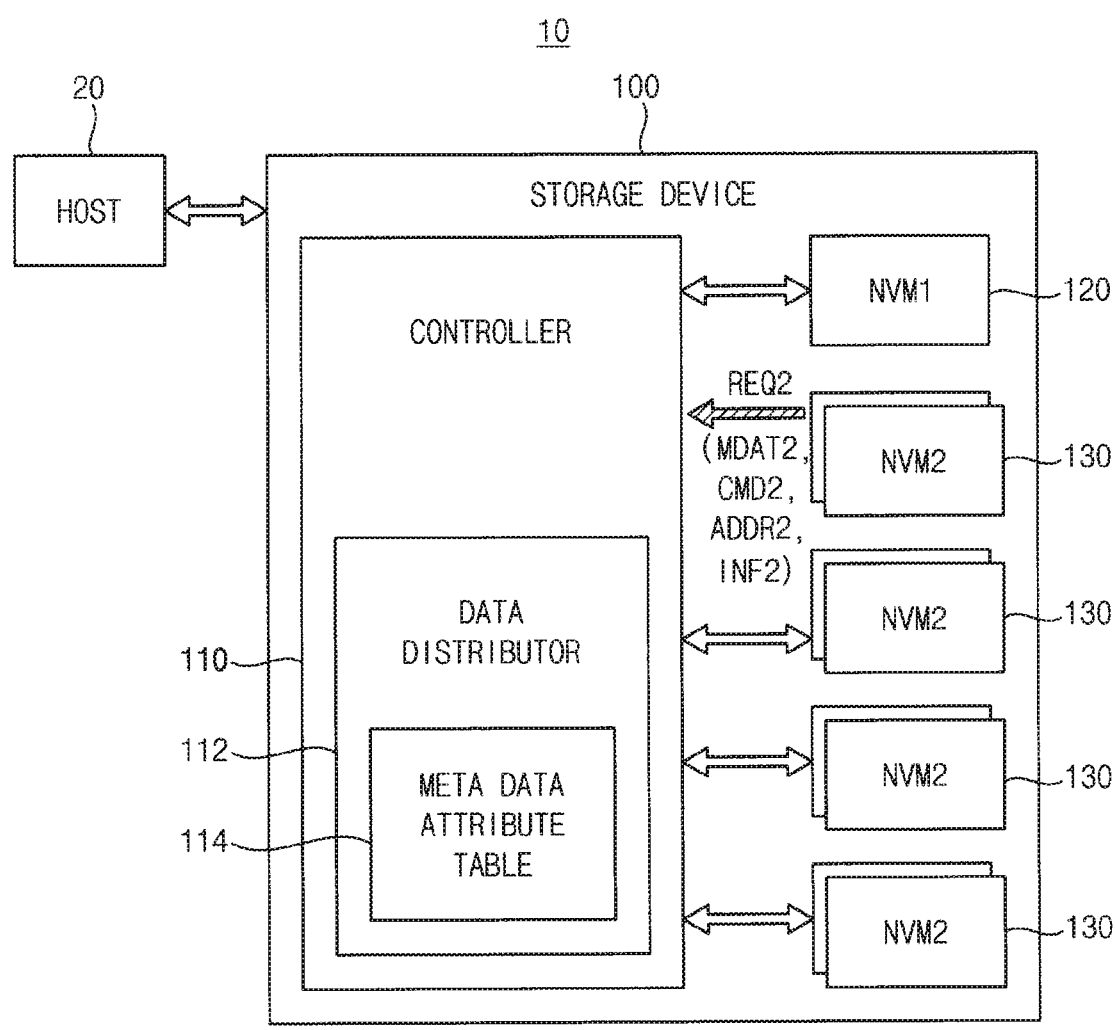
FIG. 9 is a diagram for describing an operation of accessing data of FIG. 8.

FIG. 8 is a flow chart illustrating a method of accessing data according to an exemplary embodiment of the inventive concept. FIG. 9 is a diagram for describing an operation of accessing data of FIG. 8. The descriptions repeated with FIGS. 6 and 7 may be omitted.

Referring to FIGS. 1, 5, 8 and 9, when detecting the attribute of the meta data (step S200), the controller 110 and/or the data distributor 112 may receive a second access request REQ2 for the second meta data MDAT2, and the attribute of the second meta data MDAT2 may be detected based on the meta data attribute table MDA_TABLE in response to receiving the second access request REQ2. As with the first access request REQ1, the second access request REQ2 may include the second meta data MDAT2, a second command CMD2, a second address ADDR2 and second information INF2. The meta data attribute table MDA_TABLE may be searched based on the second meta data MDAT2 or the second information INF2 included in the second access request REQ2 to detect the attribute of the second meta data MDAT2.

In an exemplary embodiment, as illustrated in FIG. 5, the attribute of the second meta data MDAT2 is the second data attribute ATTR2 representing reliability for temperature. For example, if the second meta data MDAT2 is debugging data that is used in a high temperature environment having a temperature higher than a reference temperature, the attribute of the second meta data MDAT2 corresponds to the second data attribute ATTR2. In addition, if the second meta data MDAT2 is the debugging data, the second access request REQ2 for the second meta data MDAT2 may be provided from an internal memory (e.g., the second nonvolatile memory 130).

Typically, the debugging data may be used for analyzing defective units when the defective units are recalled from customers and/or end users after a plurality of storage devices 100 have completely fabricated and shipped. To analyze the defective units, the storage device 100 and/or the nonvolatile memories 120 and 130 that are attached on a printed circuit board (PCB) should be detached from the PCB by heat, and thus the debugging data needs to be stored in a memory having higher reliability for temperature.

When determining the target memory (step S300), when the attribute of the second meta data MDAT2 corresponds to the second data attribute ATTR2 representing reliability for temperature (step S320: YES), the second nonvolatile memory 130 may be selected as the target memory (step S360). The second nonvolatile memory 130 may have reliability for temperature (e.g., strong against high temperature) higher than that of the first nonvolatile memory 120. For example, the first nonvolatile memory 120 may include a PRAM, and the second nonvolatile memory 130 may include a flash memory. Data stored in a PRAM may be overwritten and damaged when memory cells of a PRAM is heated, and thus a PRAM may have lower reliability for temperature.

When performing the access operation on the target memory (step S400), at least one of read/program/erase operations may be performed on the second nonvolatile memory 130 (step S420). For example, if the second command CMD2 included in the second access request REQ2 is a write command, the second meta data MDAT2 may be programmed or stored in the second nonvolatile memory 130 based on the second address ADDR2. If the second command CMD2 included in the second access request REQ2 is a read command, the second meta data MDAT2 may be retrieved or read from the second nonvolatile memory 130 based on the second address ADDR2. If the second command CMD2 included in the second access request REQ2 is an erase command, the second meta data MDAT2 may be erased or deleted from the second nonvolatile memory 130 based on the second address ADDR2.

When the attribute of the second meta data MDAT2 does not correspond to the second data attribute ATTR2 representing reliability for temperature (step S320: NO), steps S360 and S420 are not performed, and an operation of searching the meta data attribute table MDA_TABLE may be repeated until the attribute of the second meta data MDAT2 is detected.

Figure 10:
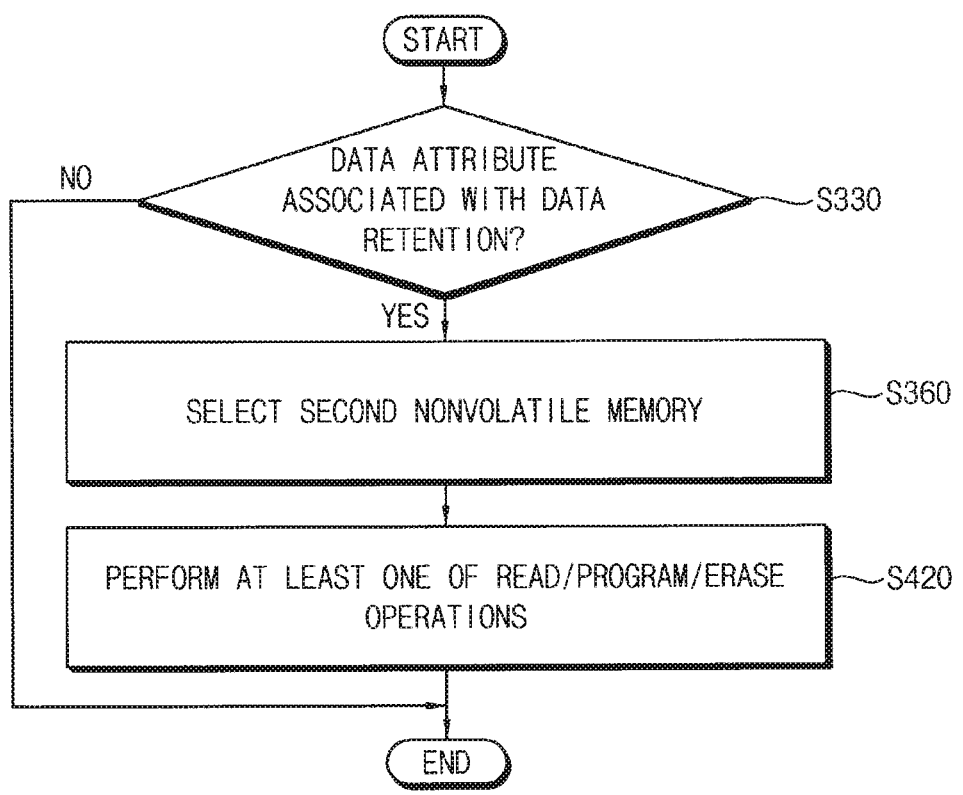
FIGS. 10 and 11 are flow charts illustrating still other examples of accessing data based on a method of accessing data according to an exemplary embodiment of the inventive concept.
Figure 11:
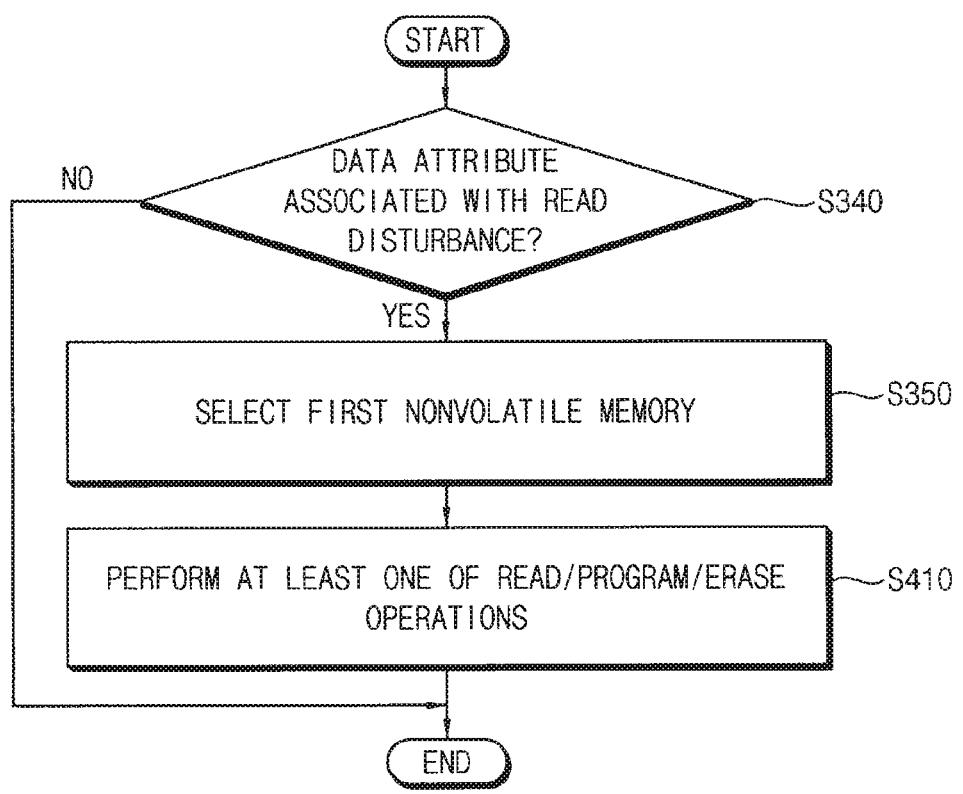

FIGS. 10 and 11 are flow charts illustrating a method of accessing data according to an exemplary embodiment of the inventive concept. The descriptions repeated with FIGS. 6 through 9 may be omitted.

Referring to FIGS. 1, 5 and 10, when detecting the attribute of the meta data (step S200), the controller 110 and/or the data distributor 112 may receive a third access request for the third meta data MDAT3, and the attribute of the third meta data MDAT3 may be detected based on the meta data attribute table MDA_TABLE in response to receiving the third access request.

In an exemplary embodiment, as illustrated in FIG. 5, the attribute of the third meta data MDAT3 is the third data attribute ATTR3 representing reliability for data retention. For example, if the third meta data MDAT3 is firmware data that requires a retention time longer than a reference time, the attribute of the third meta data MDAT3 corresponds to the third data attribute ATTR3. In addition, as with an example illustrated in FIG. 7, if the third meta data MDAT3 is the firmware data, the third access request for the third meta data MDAT3 may be provided from the external host 20.

When determining the target memory (step S300), when the attribute of the third meta data MDAT3 corresponds to the third data attribute ATTR3 representing reliability for data retention (step S330: YES), the second nonvolatile memory 130 may be selected as the target memory (step S360). The second nonvolatile memory 130 may have reliability for data retention higher than that of the first nonvolatile memory 120. For example, the second nonvolatile memory 130 may include a flash memory. In addition, when performing the access operation on the target memory (step S400), at least one of read/program/erase operations may be performed on the second nonvolatile memory 130 (step S420). Steps S360 and S420 in FIG. 10 may be substantially the same as steps S360 and S420 in FIG. 8, respectively.

When the attribute of the third meta data MDAT3 does not correspond to the third data attribute ATTR3 representing reliability for data retention (step S330: NO), steps S360 and S420 are not performed, and an operation of searching the meta data attribute table MDA_TABLE may be repeated until the attribute of the third meta data MDAT3 is detected.

Referring to FIGS. 1, 5 and 11, when detecting the attribute of the meta data (step S200), the controller 110 and/or the data distributor 112 may receive a fourth access request for the fourth meta data MDAT4, and the attribute of the fourth meta data MDAT4 may be detected based on the meta data attribute table MDA_TABLE in response to receiving the fourth access request.

In an exemplary embodiment, as illustrated in FIG. 5, the attribute of the fourth meta data MDAT4 is the fourth data attribute ATTR4 representing reliability for read disturbance. For example, if the fourth meta data MDAT4 is data that requires a read operation to be executed a number of times greater than a reference number, the attribute of the fourth meta data MDAT4 may correspond to the fourth data attribute ATTR4. In addition, as with an example illustrated in FIG. 7, if the fourth meta data MDAT4 is the data that requires a read operation to be executed a number of times greater than the reference number, the fourth access request for the fourth meta data MDAT4 may be provided from the external host 20.

When determining the target memory (step S300), when the attribute of the fourth meta data MDAT4 corresponds to the fourth data attribute ATTR4 representing reliability for read disturbance (step S340: YES), the first nonvolatile memory 120 may be selected as the target memory (step S350). The first nonvolatile memory 120 may have reliability for read disturbance higher than that of the second nonvolatile memory 130. For example, the first nonvolatile memory 120 may include a PRAM. In addition, when performing the access operation on the target memory (step S400), at least one of read/program/erase operations may be performed on the first nonvolatile memory 120 (step S410). Steps S350 and S410 in FIG. 11 may be substantially the same as steps S350 and S410 in FIG. 6, respectively.

When the attribute of the fourth meta data MDAT4 does not correspond to the fourth data attribute ATTR4 representing reliability for read disturbance (step S340: NO), steps S350 and S410 are not performed, and an operation of searching the meta data attribute table MDA_TABLE may be repeated until the attribute of the fourth meta data MDAT4 is detected.

Examples of selecting the target memory optimized for the meta data are not limited to examples described with reference FIGS. 6, 8, 10 and 11 and may be changed according to exemplary embodiments. For example, the target memory optimized for the meta data may be selected by determining whether the attribute of the meta data corresponds to two or more data attributes. In other words, the target memory optimized for the meta data may be selected by combining two or more steps S310 in FIG. 6, S320 in FIG. 8, S330 in FIGS. 10 and S340 in FIG. 11. For another example, the target memory optimized for the meta data may be selected by determining whether the attribute of the meta data corresponds to other various attributes (e.g., other key parameters such as performance).

Figure 12:
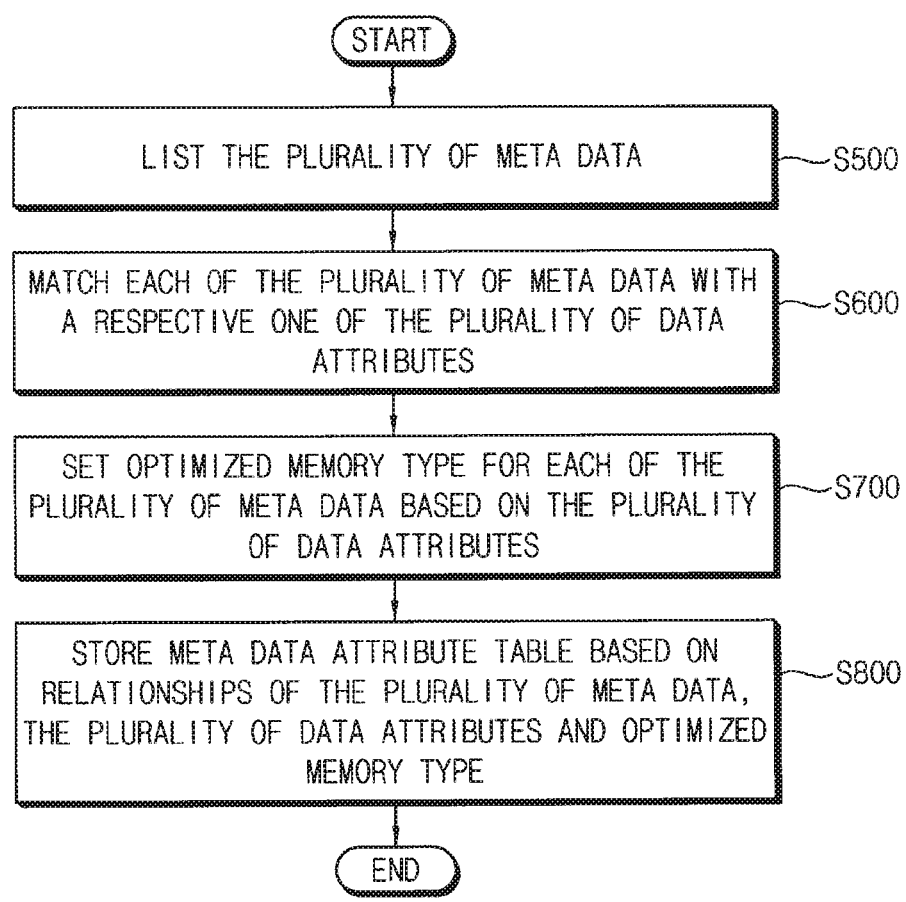
FIG. 12 is a flow chart illustrating a method of managing data in a storage device according to an exemplary embodiment of the inventive concept.

FIG. 12 is a flow chart illustrating a method of managing data in a storage device according to an exemplary embodiment of the inventive concept. The descriptions repeated with FIG. 1 may be omitted.

Referring to FIG. 12, a method of managing data according to an exemplary embodiment is executed or performed by a storage device that includes a first nonvolatile memory and a second nonvolatile memory. The first and second nonvolatile memories are different types of memories. Detailed configurations of the storage device may be substantially the same as the storage device 100 described with reference to FIGS. 2 through 4.

In the method of managing data in the storage device according to an exemplary embodiment, a plurality of meta data used for controlling an operation of the storage device are listed (step S500). Each of the plurality of meta data is matched with a respective one of a plurality of data attributes (step S600). An optimized memory type for each of the plurality of meta data is set to one of the first nonvolatile memory and the second nonvolatile memory based on the plurality of data attributes (step S700). A meta data attribute table is stored based on relationships of the plurality of meta data, the plurality of data attributes and the optimized memory type (step S800). For example, steps S500, S600, S700 and S800 may be executed or performed by the controller 110 and/or the data distributor 112 in FIG. 2, and the meta data attribute table MDA_TABLE in FIG. 5 may be set as a result of steps S500, S600, S700 and S800.

In an exemplary embodiment, the meta data attribute table is set and stored at an initial operation time (e.g., in advance at a design/development phase, a manufacturing phase or a boot time), and the pre-stored meta data attribute table is loaded or restored to use after the initial operation time. In addition, the meta data attribute table may be updated in real-time or during runtime according to an operation of the storage device.

In an exemplary embodiment, steps S500, S600, S700 and S800 are executed or performed as a part of step S100 in FIG. 1. In other words, an operation of setting the meta data attribute table in step S100 of FIG. 1 may be executed or performed by sequentially executing or performing steps S500, S600, S700 and S800.

Figure 13:
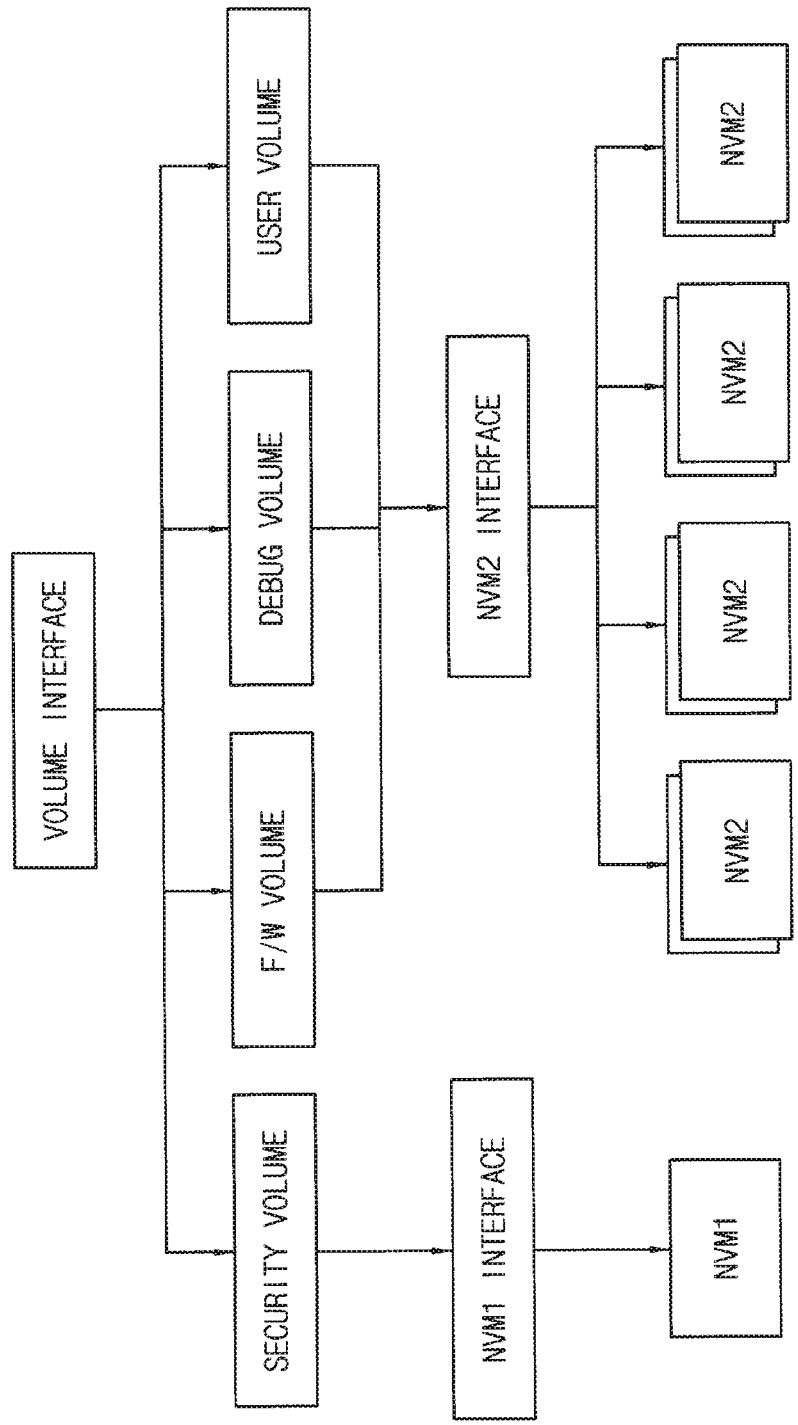
FIG. 13 is a diagram for describing a method of accessing data according to an exemplary embodiment of the inventive concept.

FIG. 13 is a diagram for describing a method of accessing data according to an exemplary embodiment of the inventive concept.

Referring to FIGS. 5 and 13, the nonvolatile memories NVM1 and NVM2 may be accessed through a volume interface including various volumes and a memory interface, and the target memory may be determined or selected and may be accessed based on the meta data attribute table MDA_TABLE.

For example, meta data (e.g., the first meta data MDAT1) which is the security data or has a security volume may be accessed from the first nonvolatile memory NVM1 through a first nonvolatile memory interface. Meta data (e.g., the second meta data MDAT2) which is the debugging data or has a debug volume, and meta data (e.g., the third meta data MDAT3) which is the firmware data or has a firmware (F/W) volume may be accessed from the second nonvolatile memory NVM2 through a second nonvolatile memory interface. Data other than the meta data and user data which has a user volume may be accessed from the second nonvolatile memory NVM2 through the second nonvolatile memory interface, without considering the meta data attribute table MDA_TABLE.

Although exemplary embodiments are described based on the storage device 100 including two different types of nonvolatile memories 120 and 130, the inventive concept is not limited thereto. For example, the storage device may include three of more different types of nonvolatile memories, and an optimized nonvolatile memory for each meta data may be determined from one of three of more different types of nonvolatile memories based on an attribute of the meta data.

As will be appreciated by those skilled in the art, the inventive concept may be embodied as a system, method, computer program product, and/or a computer program product embodied in one or more computer readable medium(s) having computer readable program code embodied thereon. The computer readable program code may be provided to a processor of a general purpose computer, a special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 14:
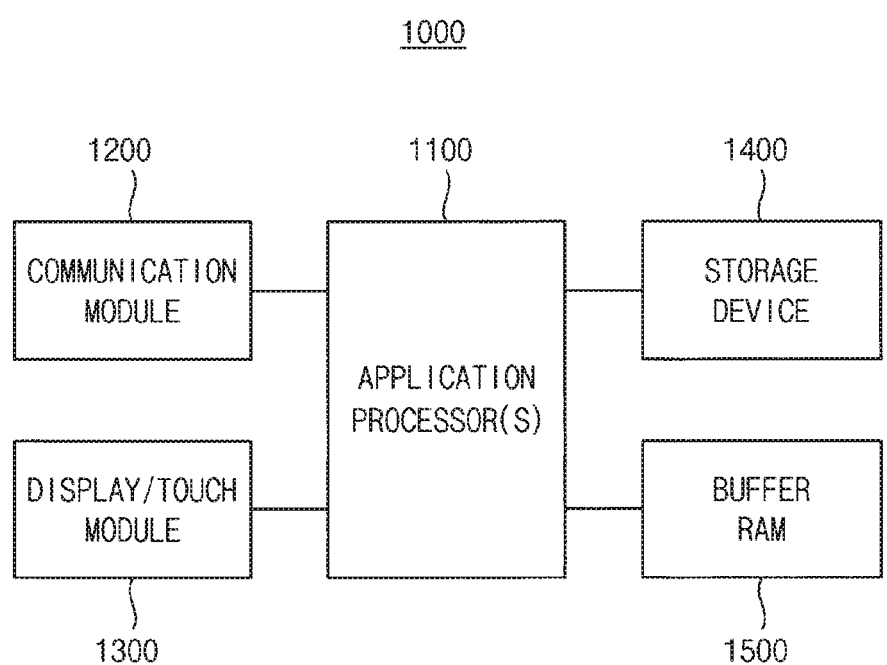
FIG. 14 is a block diagram illustrating a mobile device including a storage device according to an exemplary embodiment of the inventive concept.

FIG. 14 is a block diagram illustrating a mobile device including a storage device according to an exemplary embodiment of the inventive concept.

Referring to FIG. 14, a mobile device 1000 includes an application processor 1100, a communication module 1200 (e.g., a transceiver), a display/touch module 1300, a storage device 1400, and a buffer RAM 1500.

The application processor 1100 controls operations of the mobile device 1000. The application processor 1100 may execute an application or a program such as a video, a game, a web browser, etc. The communication module 1200 is implemented to perform wireless or wire communications with an external device. The display/touch module 1300 is implemented to display data processed by the application processor 1100 and/or to receive data through a touch panel. The storage device 1400 is implemented to store user data.

The storage device 1400 may be implemented by the storage device 100 according to an exemplary embodiment, and may perform one of the above-described methods of accessing data according to an exemplary embodiment of the inventive concept. For example, the attributes of the plurality of meta data may be checked, analyzed and classified in advance to set the meta data attribute table. When an access request for meta data is received, an optimized nonvolatile memory for the access-requested meta data may be determined based on the meta data attribute table and the attribute of the access-requested meta data. Accordingly, the plurality of meta data may be efficiently managed and accessed with relatively high performance and reliability.

The buffer RAM 1500 temporarily stores data used for processing operations of the mobile device 1000. For example, the buffer RAM 1500 may be DDR SDRAM, LPDDR SDRAM, GDDR SDRAM, or RDRAM.

The inventive concept may be applied to various devices and systems that include a storage device. For example, the inventive concept may be applied to systems such as a personal computer, a laptop computer, a mobile phone, a smart phone, a tablet computer, a laptop computer, a PDA, an EDA, a PMP, a digital camera, a music player, a portable game console, a navigation device, a wearable device, an IoT device, an IoE device, a VR device, or an AR device.

The foregoing is illustrative of exemplary embodiments of the inventive concept and is not to be construed as limiting thereof. Although some exemplary embodiments have been described, many modifications are possible in these exemplary embodiments without materially departing from the inventive concept. Accordingly, all such modifications are intended to be included within the scope of the inventive concept.

What is claimed is:

1. A method of accessing data in a storage device including a first nonvolatile memory and a second nonvolatile memory that are different types of memories, the method comprising:

classifying each of a plurality of meta data as being associated with one of the types of memories based on a data attribute among a plurality of data attributes associated with the meta data and setting a meta data attribute table based on a result of the classifying, the plurality of meta data being used for controlling an operation of the storage device;

detecting a data attribute of first meta data among the plurality of meta data based on the meta data attribute table in response to receiving a first access request for the first meta data;

determining a target memory from among the first and second nonvolatile memories that is optimal for storing the first meta data based on the detected data attribute of the first meta data; and performing an access operation on the target memory based on the first meta data.

2. The method of claim 1, wherein the plurality of data attributes include at least one of a first data attribute representing reliability for program/erase (P/E) cycles, a second data attribute representing reliability for temperature, a third data attribute representing reliability for data retention, and a fourth data attribute representing reliability for read disturbance.

3. The method of claim 2, wherein, if the first meta data is security data that is used in a secure mode and requires a P/E operation to be executed a number of times greater than a reference number, the data attribute of the first meta data corresponds to the first data attribute.

4. The method of claim 3, wherein determining the target memory includes:

selecting the first nonvolatile memory as the target memory, the first nonvolatile memory having a reliability for P/E cycles higher than that of the second nonvolatile memory.

5. The method of claim 2, wherein, if the first meta data is debugging data that is used in a high temperature environment having a temperature higher than a reference temperature, the data attribute of the first meta data corresponds to the second data attribute.

6. The method of claim 5, wherein determining the target memory includes:

selecting the second nonvolatile memory as the target memory, the second nonvolatile memory having a reliability for temperature higher than that of the first nonvolatile memory.

7. The method of claim 2, wherein, if the first meta data is firmware data that requires a retention time longer than a reference time, the data attribute of the first meta data corresponds to the third data attribute.

8. The method of claim 7, wherein determining the target memory includes:

selecting the second nonvolatile memory as the target memory, the second nonvolatile memory having a reliability for data retention higher than that of the first nonvolatile memory.

9. The method of claim 2, wherein, if the first meta data is data that requires a read operation to be executed a number of times greater than a reference number, the attribute of the first meta data corresponds to the fourth data attribute.

10. The method of claim 9, wherein determining the target memory includes:

selecting the first nonvolatile memory as the target memory, the first nonvolatile memory having a reliability for read disturbance higher than that of the second nonvolatile memory.

11. The method of claim 1, wherein setting the meta data attribute table includes:

listing the plurality of meta data;

matching each of the listed meta data with a respective one of the plurality of data attributes;

setting an optimized memory type for each of the listed meta data to one of the first nonvolatile memory and the second nonvolatile memory based on the plurality of data attributes; and storing the meta data attribute table based on relationships of the plurality of meta data, the plurality of data attributes and the optimized memory type.

12. The method of claim 1, wherein the first access request for the first meta data is received from a host that is located outside the storage device.

13. The method of claim 1, wherein the first access request for the first meta data is received from one of the first nonvolatile memory and the second nonvolatile memory that are located inside the storage device.

14. The method of claim 1, wherein the access operation includes a read operation in which the first meta data is retrieved from the target memory.

15. The method of claim 1, wherein the access operation includes a program operation in which the first meta data is stored into the target memory.

16. The method of claim 1, wherein the access operation includes an erase operation in which the first meta data is deleted from the target memory.

17. A method of managing data in a storage device including a first nonvolatile memory and a second nonvolatile memory that are different types of memories, the method comprising:

generating a meta data attribute table including a plurality of entries, where each entry corresponds to one of a plurality of meta data used for controlling an operation of the storage device;

for each entry, selecting one of a plurality of data attributes that is appropriate for the meta data of the corresponding entry, and inserting the selected one data attribute into the corresponding entry;

for each entry, selecting an optimized memory type from among the first and second nonvolatile memories based on the corresponding data attribute, and inserting the selected optimized memory type into the corresponding entry; and storing the meta data attribute table.

18. A storage device comprising:

a first nonvolatile memory;

a second nonvolatile memory, the first nonvolatile memory and the second nonvolatile memory being different types of memories; and a controller configured to control an operation of the first nonvolatile memory and the second nonvolatile memory, to classify each of a plurality of meta data as being associated with one of the types of memories based on a data attribute among a plurality of data attributes associated with the meta data, to set a meta data attribute table based on a result of the classify, to detect a data attribute of first meta data among the plurality of meta data based on the meta data attribute table in response to receiving a first access request for the first meta data, to determine a target memory among the first and second nonvolatile memories that is optimal for storing the first meta data based on the detected data attribute of the first meta data, and to perform an access operation on the target memory based on the first meta data, the plurality of meta data being used for controlling an operation of the storage device.

19. The storage device of claim 18, wherein the first nonvolatile memory includes a phase change random access memory (PRAM), and the second nonvolatile memory includes a flash memory.

20. The storage device of claim 18, wherein the storage device is one of a solid state drive (SSD), a multi media card (MMC), an embedded multi media card (eMMC) and a universal flash storage (UFS).

* * * * *